United States Patent [19]
Rizer et al.

[11] 3,798,767
[45] Mar. 26, 1974

[54] APPARATUS FOR CUTTING FLEXIBLE MATERIAL

[75] Inventors: Brooks Rizer, Dalton; Haskel Douglas Hayes, Rocky Face, both of Ga.

[73] Assignee: Textile & Industrial Sales, Inc., Dalton, Ga.

[22] Filed: Oct. 24, 1972

[21] Appl. No.: 299,797

[52] U.S. Cl.................... 30/206, 83/508, 83/676, 83/485, 30/240
[51] Int. Cl.......................... B26d 1/20, B23d 19/02
[58] Field of Search........ 83/508, 485, 676; 30/205, 30/206, 240

[56] References Cited
UNITED STATES PATENTS

| | | |
|---|---|---|
| 1,796,463 | 3/1931 | Kaltenbach et al............... 83/508 X |
| 1,914,528 | 6/1933 | Reid................................. 83/508 X |
| 2,771,949 | 11/1956 | Sigoda............................. 83/508 X |
| 3,262,201 | 7/1966 | Docken............................... 30/240 |

Primary Examiner—Donald R. Schran
Attorney, Agent, or Firm—Jones, Thomas & Askew

[57] ABSTRACT

Apparatus for cutting flexible sheet material such as fabric, carpet, and the like. A circular cutting blade is provided with a plurality of projections which extend outwardly from the circumference of the blade. The projections preferably have outer extremities which lack a sharp point or edge of the kind typically associated with the conventional saw blade. A line of intersection of the circumference of the blade with a side of the blade is sharpened to provide a cutting edge, and the blade is mounted adjacent a stationary cutting edge so that the cutting edge of the blade makes shearing contact with the stationary cutting edge. The stationary cutting edge and the cutting blade may be resiliently biased into contact with each other. The shearing interaction between the stationary cutting edge and the rotary cutting blade is obtained with relatively low rotational speed of the cutting blade, and the absence of sharp points or ends on the projections of the cutting blade, removes a source of potential personal injury present with prior-art cutting apparatus.

8 Claims, 4 Drawing Figures

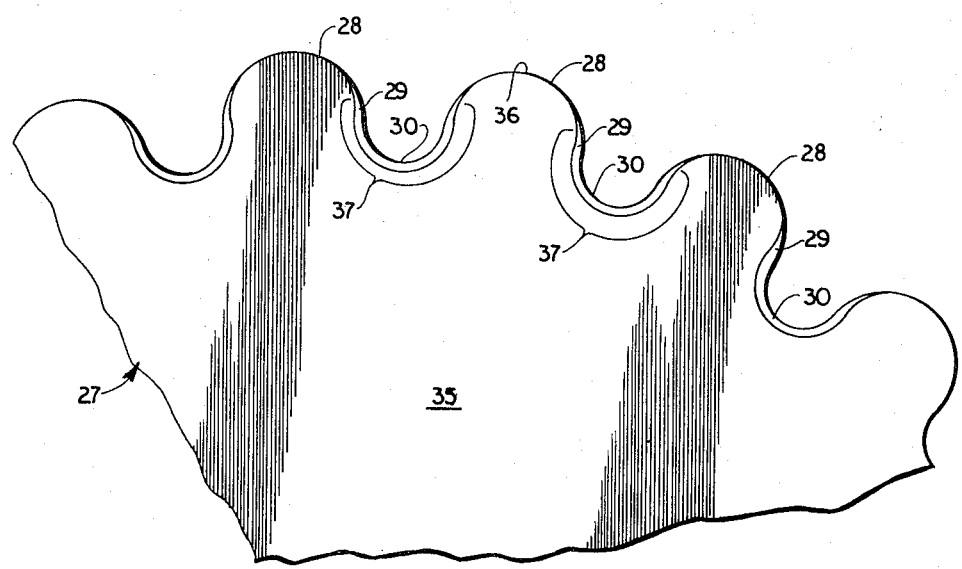
FIG 2
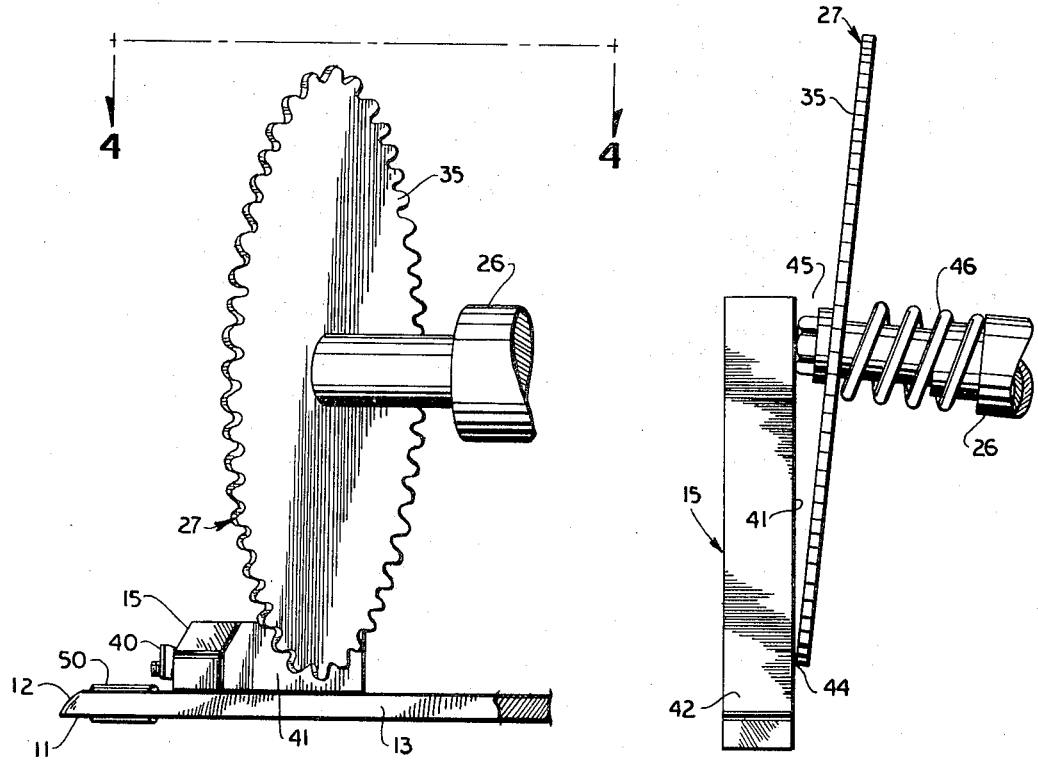
FIG 3
FIG 4

APPARATUS FOR CUTTING FLEXIBLE MATERIAL

This invention relates in general to cutting apparatus and in particular to apparatus for cutting flexible sheet material such as fabric, carpet, or the like.

There is a substantial and recognized need for an apparatus which can effectively and rapidly cut flexible material, such as textile fabric, carpet, or the like, at a rate compatible with the commercial requirements of manufacturers and users of such material. The production rates which are required by such users virtually eliminate such manual implements as knives and scissors, inasmuch as power-driven cutting elements are virtually mandatory to achieve the desired cutting speed.

Prior-art fabric cutting devices typically employ either one blade or a pair of rotary blades having very sharp peripheral edges which extend radially outwardly. The blades of the two-blade devices are positioned so that these peripheral edges overlap each other to some extent. The peripherally-overlapping rotary blades are driven in counter-rotating movement, and the fabric or other material to be cut is fed to the area of blade overlap. While apparatus of this type if generally effective for its intended purpose of cutting, the operation of such apparatus is not without attendant disadvantages. For example, the blade of the single-blade devices must be driven at rotation speeds as great as several thousand revolutions per minute, and the peripheral edges of blades rotating at these speeds are extremely hazardous to people working nearby. The velocity of the sharp peripheral edges of such blades is such that a hand or arm which inadvertently contacts the blade can be cut virtually to the bone before the person even realizes what is happening. The two-blade devices, while operating at lower rotational speed, are unwieldly and cumbersome in many applications.

Such prior-art cutting apparatus has other known operational disadvantages. For example, it is difficult to use such apparatus for cutting material made with synthetic fibers, since the rapidly-spinning blades generate enough heat to melt the synthetic fibers. Further yet, it is difficult to adapt a cutting apparatus having a pair of confronting, peripherally-overlapping blades for use as a portable or hand-held cutting apparatus which can be moved along a cutting table or a floor to cut a fabric or carpet which is stationary.

Accordingly, it is an object of the present invention to provide improved apparatus for cutting flexible material.

It is another object of the present invention to provide apparatus for cutting flexible material with reduced risk of personal injury.

It is a further object of the present invention to provide apparatus for cutting flexible material made of synthetic fiber without damaging the material by an excessive amount of heating.

It is still another object of the present invention to provide apparatus for cutting flexible material and for feeding the material into the cutting region.

Other objects and many of the attendant advantages of the present invention will become apparent from the following description of the invention as shown in the disclosed preferred embodiment, wherein:

FIG. 2 shows an isometric view of an enlarged portion of the cutting blade shown in FIG. 1;

FIG. 3 is an elevational section view taken along line 3—3 of FIG. 1; and

FIG. 4 is a planned section view taken along line 4—4 of FIG. 3.

Figure 1:
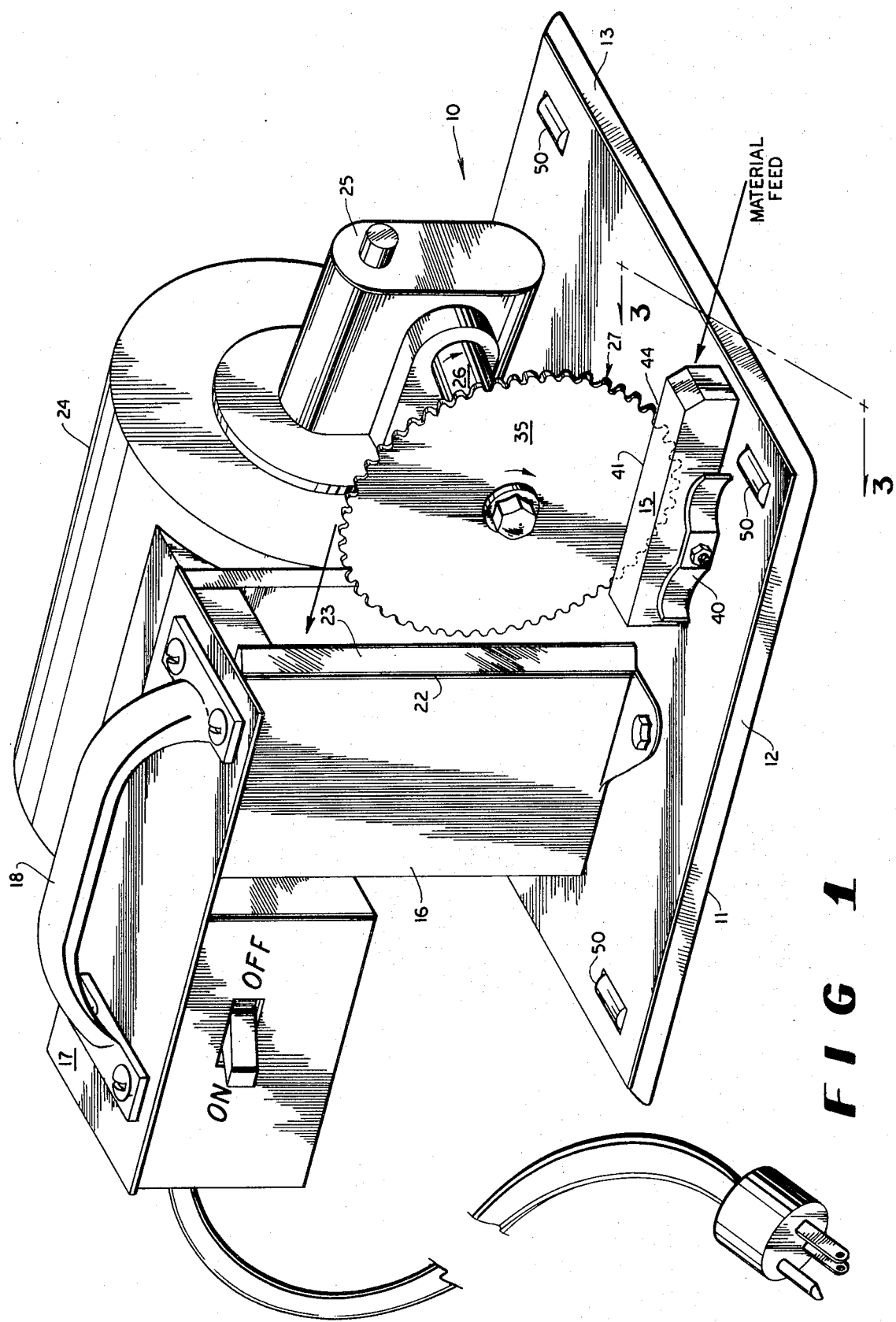
FIG. 1 shows an isometric view of the disclosed embodiment of the invention.

Stated in general terms, the present invention operates to provide shearing at a location of contact between a stationary shearing edge and a rotary shearing edge. The rotary shearing edge is provided by a rotary cutting blade having a plurality of projections disposed around the circumference of the wheel and extending outwardly therefrom. A side of the cutting blade intersects the circumferential periphery of the blade along an edge line which is sharpened, at least in part, to provide a cutting edge for shearing engagement with the stationary cutting edge. The circumferential projections on the cutting blade, function as fingers or members which assist in feeding the material being cut into the point of shearing contact between the stationary blade and the rotating blade.

For a more specific description of the nature and operation of the present invention, reference is taken to a disclosed embodiment thereof as indicated generally at 10 and including a foot 11 having sloped or beveled sides 12 and 13 extending to an upper surface 14 on which is mounted the anvil member 15. An upstanding member 16 extends upwardly from the upper surface 14 to terminate at an upper end 17 to which is attached a suitable handle 18. One side 22 of the upstanding member 16 is formed to provide a parting edge 23 to assist in manipulating the severed material, as will become more apparent below.

A motor 24 is suitably attached to the upstanding member 16 and is connected through an appropriate speed reducing mechanism 25 to impart rotation to the shaft 26.

A cutting blade 27 forming an important part of the present invention is removably secured for rotation by the shaft 26. Although the cutting blade 27 may appear at a glance to resemble a conventional circular saw blade having peripherally disposed cutting teeth, a more detailed view of the blade 27 as provided by FIG. 2 reveals a number of significant differences between the present blade and a conventional circular saw blade. The circumference of the cutting blade 27 includes a plurality of outwardly-extending projections 28, and these projections define the circumference of the cutting blade 27 to include a repetitive series of peaks 29 interspersed between a corresponding repetitive series of valleys 30. The peaks 29 and the valleys 30 of the cutting blade 27 in the depicted embodiment are shaped to define an outer surface 31 which is continuous, and it can be seen that the circumference of this cutting blade contains no cutting teeth in the manner of the conventional circular saw blade. It is not an essential feature of the present invention that the peaks 29 and valleys 30 conjoin to provide a smooth surface 31 without discontinuity, as depicted in FIG. 2, inasmuch as the peaks 29 may be provided by material remaining after the valleys 30 have been provided by notches formed in the cutting blade 27 by stamping or any other appropriate machine process.

The side 35 of the cutting blade 27 intersects the surface 31, whether or not continuous, along an edge line 36 which is sharpened to constitute one of the two shearing edges of the cutting apparatus constructed according to the present invention. Although the entire extent of the line 36 may be sharpened, it is preferable from the standpoint of personal safety that only those portions 37 of the line 36 which are adjacent the valleys 30 be sharpened. The sharpened portions 37 of the edge line 36, as shown in FIG. 2, are not positioned at the radial extremity of the blade 27, and a person or object which accidently contacts the periphery of the blade is thus protected from making inevitable contact with the sharpened portions 37.

Returning to FIG. 1, it can be seen that the anvil 15 is resiliently biased by suitable apparatus such as the spring 40 to urge the side surface 41 of the anvil into contact with the side 35 of the cutting blade 27. The anvil 15 includes a top surface 42 which intersects the side surface 41 along an edge line 43 which is suitably sharpened to provide a second shearing surface of the present cutting apparatus. The anvil 15 and the cutting blade 27 are preferably mounted to maintain relative positioning skewed with respect to each other, as best shown in FIG. 4, so that the cutting blade is biased into contact with the side surface 41 and the shearing edge line 43 to define a cutting entrace location 44, thus providing an amount of clearance 45 between the side surface 41 of the anvil and the side 35 of the cutting blade. The amount of clearance 45 is not considered critical, and may be in the order of a few thousandths of an inch.

Although the anvil 15 is shown in FIGS. 1 and 3 to be resiliently biased into contact with the cutting blade 27, an alternative construction of the present apparatus is shown in FIG. 4 to include the anvil 15 rigidly attached to the upper surface 14 of the foot 11 and to include the cutting blade 27 mounted on a shaft which is biased by the spring 46 into engagement with the side surface 41 of the anvil. It will be understood by those skilled in the art that either the anvil or the cutting blade 27 may be biased to provide the desired resilient engagement between the edge line 43 and the cutting blade, although a resiliently biased anvil 15 and a fixed rotary cutting blade 27, as depicted in FIGS. 1 and 3, may be less expensive to manufacture.

The cutting operation of the disclosed embodiment is now discussed. With the cutting blade 27 being driven for rotation by the motor 24, the carpet, fabric, or other flexible material to be cut is manually or mechanically fed into the cutting entrance location 44. Although the projections 28 disposed around the periphery of the cutting blade 27 are typically dull and incapable of cutting the material, these projections frictionally engage the material and provide a feeding action tending to move the material toward and against the shearing or cutting location defined by the area of contact between the sharpened edge line 43 of the anvil and the sharpened portions 37 of the edge line 36 on the cutting blade 27. After the material is severed at that location, the two segments of the material pass along both sides of the blade 27 and are guided by the parting edge 23 to pass along the sides of the upstanding member 16.

A plurality of rollers 50 may advantageously be mounted on the foot 11 to extend beneath the lower surface of the foot, so that the entire cutting apparatus 10 can be easily rolled along a plane surface. Thus, the cutting apparatus of the present invention can be grasped by the handle 18 and moved along a floor on which a carpet is being laid, for example, to provide rapid cutting of the carpet without requiring the carpet to be removed to a stationary cutting machine. The rollers 50 may also be used to permit the cutting apparatus to be manually moved along a cutting table, for example, to perform cutting of one or more layers of fabric disposed on the cutting table.

Since the apparatus of the present invention shears or cuts material by means of a shearing action between the sharpened portions 37 of the blade and the sharpened edge 43 of the stationary anvil 15, the relatively high rotational speed associated with prior-art cutting apparatus is not necessary. Accordingly, the fabric-contacting portions of the present apparatus do not become heated to an extent which causes melting or other damage to synthetic fibers. Furthermore, the reduced rotational speed of the cutting blade 27, as well as the fact that the present cutting blade does not require either a sharpened knife-line radially peripheral edge or cutting teeth, greatly lessens the likelihood of physical injury to a person who accidently contacts the rotating blade. Even if the entire edge line 36 of the blade is sharpened, rather than only the portions 37 thereof, it will be understood that a substantial cutting injury with such a blade can result only from physical contact with the edge line 36 at a particular angle and with a sizeable amount of force. While such circumstances may occasionally occur, it can be seen that the probability of injury from a mere brushing contact with the rotating blade is greatly reduced according to the apparatus of the present invention.

Although the outer surface 31 of the cutting blade 27 is depicted as being substantially parallel to the axis of blade rotation, so that the edge line 36 of the cutting blade is defined by susbstantially a right angle, this angular relationship is not considered critical and may be varied provided the requisite sharpness of the edge line 36 (or at least the sharpened portions 37 thereof) are maintained.

Moreover, while the use of foot 11 including rollers 50 is considered to facilitate the portable operation of the present apparatus, it will be understood by those skilled in the art that the particular design of the foot 11 is not critical to the present material cutting apparatus. Furthermore, cutting apparatus according to the present invention can be readily installed in a stationary location to perform a cutting operation in conjunction with other material handling apparatus.

Moreover, it will be apparent that the foregoing relates only to preferred embodiments of the present invention and that numerous alterations and modifications can be made in the disclosed apparatus without departing from the spirit and the scope of the invention as set forth in the appended claims.

We claim:

1. Apparatus for cutting flexible material, comprising:
    a disk having a circumference and mounted for rotation on an axis;
    the circumference of said disk including a plurality of projections extending radially outwardly;
    each of said projections formed to present a blunt surface in a direction tangent to said axis;
    said disk including a circumferentially disposed surface which intersects with a side of said disk along a line of intersection;
    said line of intersection being sharpened to define a cutting edge; and means having a stationary sharpened cutting edge and mounted to place said cutting edge into contact with said disk at a location on said sharpened line of intersection.

2. Apparatus as in claim 1, wherein said stationary cutting edge and said side of said disk are positioned to define an acute angle having an apex at said location of contact between said stationary cutting edge and said sharpened line of intersection.

3. Apparatus as in claim 1, further comprising resilient means disposed to act on at least one of said stationary cutting edge and said disk to effect yieldingly biased contact at said location of contact.

4. Apparatus as in claim 2, further comprising resilient means disposed in operative relation with at least one of said stationary cutting edge and said disk to effect yieldingly biased contact at said location of contact.

5. Apparatus as in claim 1, further comprising:

a material support surface disposed adjacent to and at a substantial angle to said stationary cutting edge and on a plane which intersects the plane occupied by said disk.

6. Apparatus as in claim 5, wherein a portion of the circumference of said disk extends below said plane occupied by said material cutting surface.

7. Apparatus as in claim 1, further comprising:

a foot member having an upper surface and a lower surface;

said stationary cutting edge mounted on said foot member in spaced relation above said upper surface; and said disk being mounted for rotation on an axis spaced above said stationary cutting edge.

8. Apparatus as in claim 7, further comprising rolling means mounted on said foot member to extend a distance below said lower surface.

* * * * *